May 16, 1967  D. C. PRIDHAM, JR  3,319,532
BELLOWS ACTUATOR
Filed Aug. 12, 1963
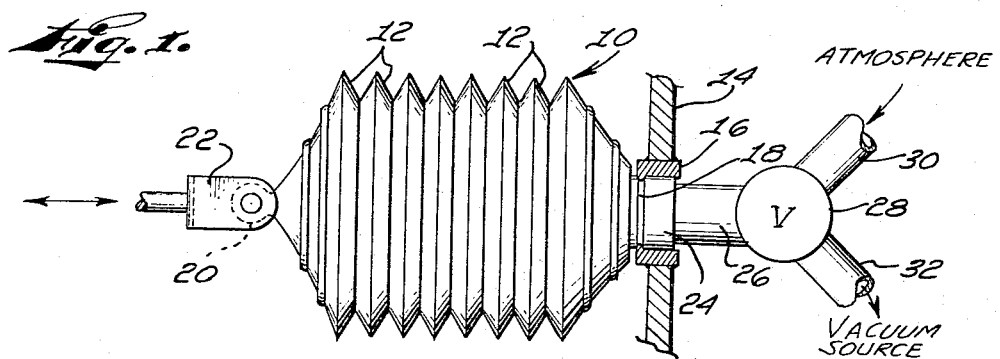
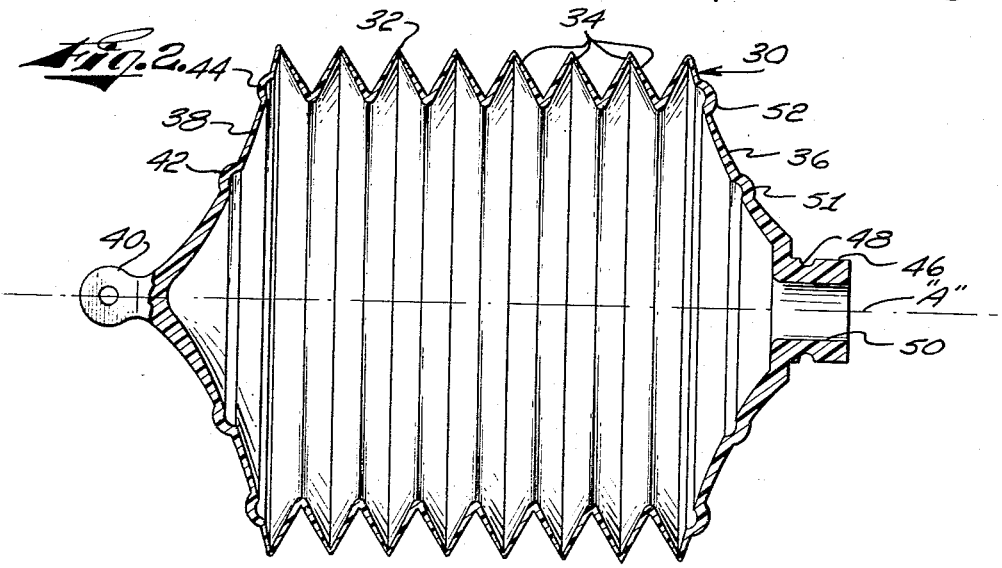
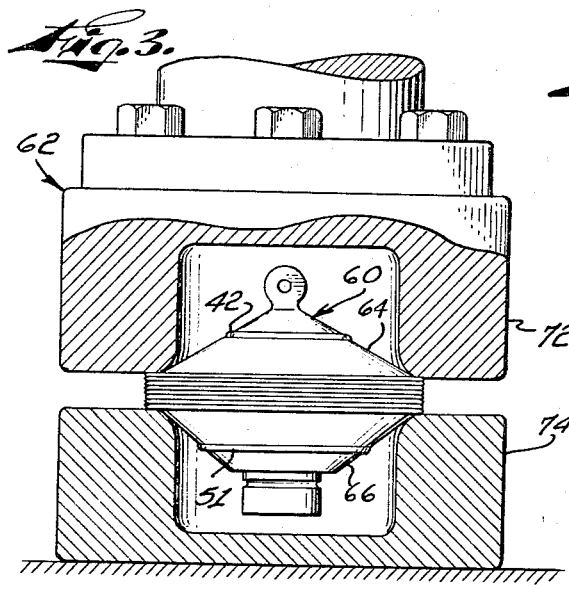
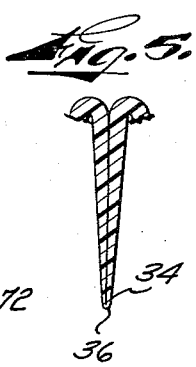
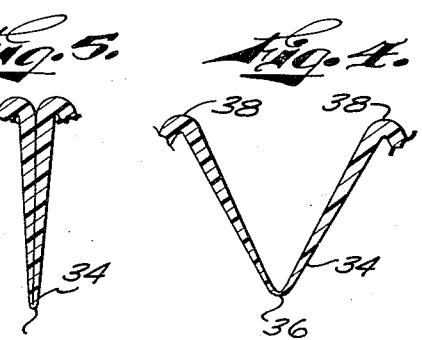
INVENTOR.
DONALD C. PRIDHAM JR.
BY
Thomas L. Kuban
ATTORNEY United States Patent Office 3,319,532
Patented May 16, 1967

3,319,532
BELLOWS ACTUATOR
Donald C. Pridham, Jr., Orange, Calif., assignor to Robertshaw Controls Company, Richmond, Va., a corporation of Delaware
Filed Aug. 12, 1963, Ser. No. 301,546
9 Claims. (Cl. 92—34)

This invention relates to a bellows structure which prevents collapse of the end portions under conditions of high vacuum.

Semi-rigid solid plastic materials are very useful in the manufacture of articles such as bellows where light weight, corrosion resistance, low cost, and other characteristics of this material is desirable or required. One obstacle which acts as a detriment in the use of these materials in most applications, is the apparent lack of flexibility and it has been necessary to substitute other and more flexible materials where flexibility is required.

It has been found in fabricating bellows from semi-rigid solid plastics, that the spring force required to collapse the bellows varies, dependent upon the temperature of the atmosphere at which the bellows are operated and the thickness of the walls. Consistency of operation is required for some uses of plastic bellows and without consistency, it was a detriment from using the plastic bellows.

It is an object of this invention to provide a flexible bellows fabricated from a semi-rigid material such as polypropylene.

It is further an object of the present invention to provide a bellows in which the end portions do not tend to collapse when subjected to vacuums.

Another object of the present invention is to provide bellows made of plastic, capable of molecular orientation by hot and cold working.

As plastics capable of molecular orientation by cold and hot working, the following synthetic linear high molecular materials are examples, namely, polypropylene, polyamides, polyurethanes, high molecular polyesters, polyvinylchloride and polyvinylidene chloride. Such plastics receive by molecular orientation an increased strength and resilience in comparison with their non-orientated state in which they are relatively stiff.

The invention is based on the discovery that when a bellows fabricated from a semi-rigid plastic material such as polypropylene is cold worked until the adjacent convolutions of the bellows are compressed, the flex life and the spring rate are improved in the bellows after the material is heated below its melting temperature and thereafter flexed at the elevated temperature. This operation appears to re-orient the plastic material during the flexing operation and it is believed to affect the fiber section in the area of the flex.

The term "spring force" as used herein means the maximum force required to totally collapse a bellows or a similar device and retain it in that position.

Other objects of this invention will appear in the following description and appended claims, reference being had to the accompany drawings forming a part of this specification wherein like reference characters designate corresponding parts in the several views:

FIGURE 1 provides an illustration of the invention as applied to a vacuum motor for providing linear motion for any mechanical component;

FIGURE 2 is an enlarged longitudinal cross-sectional view of the bellows of FIGURE 1;

FIGURE 3 illustrates the step of cold forming a bellows according to the present invention;

FIGURE 4 is an enlarged, fragmentary cross-sectional view of one convolution of a bellows according to the present invention; and FIGURE 5 is a fragmentary cross-sectional view of one convolution of a bellows according to the present invention in which the convolution is being cold worked in a manner suggested by the present invention.

Before explaining the present invention in detail, it is to be understood that the invention is not limited in its application to the details and construction in arrangement of parts nor in steps illustrated in the accompanying drawings since the invention is capable in other embodiments and of being carried out in various ways, while it is to be understood that the phraseology or terminology employed herein is for the purpose of description and not of limitation.

Referring now to the drawing, FIGURE 1 shows a bellows 10 having a plurality of accordion-type convolutions 12 formed thereon. The bellows 10 is fixedly attached to a solid wall 14 by a retainer 16 received within the bellows groove 18. The opposite end of the bellows 10 has an eye 20 formed thereon which is mounted upon a yoke 22 that may be attached to any mechanical component which requires linear movement. Nipple 24 of the bellows 10 is attached to a conduit 26 and a three-way valve symbolically illustrated at 28. Conduits 30, 32 leading to atmosphere and to a vacuum source respectively, are attached to the three-way valve 28, such that under operating conditions, the vacuum source is attached to the interior of the bellows 10 causing the convolutions 12 to compress one upon another. At a desired time, the three-way valve 28 may be rotated allowing atmospheric pressure to enter the bellows 10, thereby allowing the bellows 10 to expand and allow the mechanical component to return to the left. While this is one manner of using bellows, the illustration is merely for the sake of explaining one particular type of application of a bellows within a system.

Referring now to FIGURE 2, the bellows 30 constructed according to the present invention will be now described. Bellows 30 has a generally cylindrical body portion 32 constructed with a plurality of accordion-type convolutions 34. It is to be understood that the bellows 30 can be operated properly if constructed with but one convolution. Referring to FIGURES 2, 4 and 5, it should be noted that the cross-section of each convolution has a varying thickness. At the apex 36 or outer periphery of the convolution 34, the thickness of the bellows is at a minimum and the cross-section increases in thickness as it approaches the bottom 38 of the convolution where it reaches a maximum.

At times, the bellows is operated at extremely high vacuums or under severely high temperature conditions, both of which have a tendency of collapsing the bellows, particularly in the end portions radially. One feature of the present invention lies in the particular configuration of the end portions which tends to eliminate the radial collapse of the bellows under operating conditions. Each end portion 36, 38, of the bellows, as illustrated in FIGURE 2, has an elliptical conic shape which adds rigidity to the bellows as a whole, the elliptical conic shape being defined by rotating an ellipse about the longitudinal axis "A" so that the convex side of any axial cross section of a respective end portion will face the interior of the bellows. The left hand end portion 38 is thickest adjacent the longitudinal axis "A" of the bellows 30 and progressively gets thinner as it approaches the extremity of the end portion 38. A perforated eye 40 is integrally formed on the end portion 38 for purposes of attaching the bellows 30 to a device to be moved by the bellows.

For purposes of increasing the reinforcement of the end portions, and to prevent collapse of the end portion under extremely high vacuum conditions or high temperature conditions, or both, a pair of reinforcing ribs 42, 44 are formed in the end portion 38. The ribs 42, 44 take the shape of circular concentric projections extending outwardly from the end portion 38, greatly adding radial rigidity to the end portions of the bellows by changing the uniform cross section and thus tend to prevent any radial folding or collapsing of the end portions under extreme temperature or pressure conditions. If any collapse should occur, it will then be a diaphragm-like flex in an axial direction, which is self-limiting and restorable.

The end portion 36 on the right hand side of the bellows 30, terminates in a nipple 46 having a groove 48 therein and a passageway 50 therethrough. Groove 48 is used normally for attaching the bellows 30 to a mounting device or a conduit such that it may be connected to a source of vacuum with ease. The cross-sectional thickness progressively increases from the periphery of the end portion 36 to the most central portion of the nipple 46. A pair of circular concentric ribs 50, 52 are formed outwardly in the end portion 36 and perform the same function as the corresponding ribs in the opposite side of the bellows.

While only a pair of concentric ribs are shown, the number of ribs would only be limited by the particular size of the bellows and may be increased or decreased, depending upon the change of this size.

While a number of thermoplastic polymers capable of molecular orientations were given in the introduction of this specification, the preferred material used in the present invention is polypropylene, copolymers of ethylene-propylene, or polyallomer. Polyallomer is a plastic marketed and newly developed by Eastman Chemical Products, Inc., Kingsport, Tennessee. Basically, the polyallomer is a thermoplastic in which crystalline polymers, from one-olefins such as ethylene and propylene, are formed. However, the other synthetic linear high molecular materials may be used to advantage under environments best suited for their characteristics.

The bellows illustrated in FIGURE 2 may be fabricated by a number of conventional fabrication processes. A preferred process is the well known blow molding method, which has been used currently for blowing a great number of hollow articles. Blow molding for thermoplastics is well known in the art and will not be described for this reason. Reference is made to the book "Polypropylene," by Theodore O. J. Kressler, Reinhold Publishing Company, New York, 1960, and may be used as a reference as background.

Molecular orientation of a great number of synthetic linear high molecular materials has been known in the art for many years. For components such as bellows, molecular orientation and the cold state has not been found satisfactory, both due to the time required for performing such function and also the finished result of the bellows after cold working has been completed. There had appeared to be stresses remaining in the bellows after cold working which had affected the spring rate and flex life of the materials.

Referring now to the method practiced according to the present invention, reference is made to FIGURES 3–5. After blow molding or fabricating the bellows illustrated in FIGURE 2 to the shape desired, the method practiced according to the present invention is started thereafter. It is to be understood that the particular fabrication of the bellows is not a part of the invention and therefore shall not be described in full. Acceptable processes for method of fabricating the bellows include blow molding, slush molding, injection molding with assembly thereafter, plastisol molding, and rotational molding.

Referring now to FIGURE 3, the bellows 60 is placed within the cold working die 62 with the bellows end portions 64, 66 received by cavities formed in the upper die block 72 and lower die block 74. The size of the cavities match the approximate depth of the convolutions, thereby preventing distortion of the end portions and still allow the die to cold work the bellows. The upper and lower die blocks are brought toward each other until each convolution contacts the adjacent convolution as illustrated in FIGURE 5. The bellows need only be compressed a single time to the position illustrated in FIGURE 3. Cold working is not limited to the particular type of die illustrated in FIGURE 3 but extends to any form of mechanical or manual compressive action which would force the adjacent convolutions of the bellows together. This may be done manually with the hands, hand press, or other suitable fixtures or die which can compress the extremity of the convolutions in a manner similar to that illustrated in FIGURE 3.

After cold working, the bellows 60 are heated to a temperature below the melting point and distortion point of the plastic, which in the case of polypropylene is approximately 325°–340° F. A preferred temperature is 160°–240° F., to gain the type of performance desired from the method practiced according to the present invention. Heating of the bellows is continued until the entire bellows reach the temperature cited above and thereafter terminated.

The bellows are thereafter flexed at this elevated temperature repeatedly, preferably not exceeding ten times, which has been found to be sufficient. This flexing tends to continue molecular orientation and helps release internal stresses in the area of the flexed convolutions. Flexing may be conducted manually or in automatic flexing devices which are apparent to those skilled in the art. In the hot working flexing operation, the flexing is continued in a manner similar to the cold flexing described in relation to FIGURE 3 and in this manner the convolutions are also flexed until adjacent convolutions are contacted.

Our tests have shown that flex life is greatly increased in the present invention in that the spring force has been reduced approximately one-half, regardless of the weight and size of the bellows. For example, a bellows weighing 12 grams and having a spring force of seven pounds before orientation will have a spring force of 3.5 pounds after the process has been completed. As evidence of improved flex life, bellows orientated according to the present invention had not failed to date after 380,000 cycles of flexing, while unorientated bellows failed after a much lower number of cycles.

It is entirely possible to perform the hot working operation at the same time as heating the bellows to a temperature below the melting point of the plastic. This manner of operation is for expedience only and it certainly would increase the speed at which the entire method would be performed on a production basis.

Although a specific embodiment and method of the invention has been shown and described, it will be understood, of course, that is only illustrative and that various modifications may be made therein without departing from the scope and spirit of this invention as defined in the appended claims.

I claim:
1. A collapsible bellows customarily subjected to a vacuum for its operation comprising:
   a hollow body portion having opposed ends and including a side wall means having an accordion type convolution means for allowing compression of the bellows when the interior thereof is subjected to a vacuum, and
   end portions integral with said ends of said body portion with at least one of said end portions having the shape of a cone and including a circular rib formed therein for preventing radial collapse of that end portion when the interior of said bellows is subjected to said vacuum.

2. A collapsible bellows customarily subjected to a vacuum for its operation comprising:
   a hollow body portion having opposed ends and including a side wall means having an accordion type convolution means for allowing compression of the bellows when the interior thereof is subjected to a vacuum, and end portions integral with said ends of said body portion with at least one of said end portions having a shape of an elliptical cone so that the convex side of any axial cross section of said one end portion faces the interior of said bellows thereby tending to prevent collapse of the end portion when the interior of said bellows is subjected to said vacuum.

3. A collapsible bellows customarily subjected to a vacuum for its operation comprising:

a hollow body portion having opposed ends and including a side wall means having an accordion type convolution means for allowing compression of the bellows when the interior thereof is subjected to a vacuum, and end portions integral with said ends of said body portion with at least one of said end portions having the shape of a cone and a varying axial cross sectional thickness and being thinnest at the point of its juncture with its respective end of said body portion and progressively thickening as it extends from the body portion to its middle point thereby tending to prevent the collapse of said one end portion when the interior of said bellows is subjected to said vacuum.

4. A collapsible bellows customarily subjected to a vacuum for its operation comprising:

a hollow body portion having opposed ends and including a side wall means having at least one accordion type convolution for allowing compression of the bellows when subjected to a vacuum, and end portions integral with said ends of said body portions and each having a generally conical shape and a plurality of concentrically formed ribs for preventing the radial collapse of the respective end portions of the bellows when the interior thereof is subjected to said vacuum.

5. A collapsible bellows customarily subjected to a vacuum for its operation comprising:

a generally cylindrical hollow body portion having opposed ends and including a side wall means having an accordion type convolution means for allowing compression of the bellows when the interior thereof is subjected to a vacuum, and end portions integral with said ends of said body portion and each having an elliptical conical shape so that the convex side of any axial cross section of the respective end portion faces the interior of said bellows to prevent the radial collapse of the respective end portions of the bellows when the interior thereof is subjected to said vacuum.

6. A bellows as defined in claim 5 wherein the end portions each have respective ends of said varying cross-section being thinnest at its junction with the body portion and progressively thickening as the end portion extends from the body portion to its middle point.

7. A bellows as defined in claim 5 wherein each convolution means has a V-shaped transverse cross sectional configuration with the thinnest cross-section at the outer periphery of the convolution means and thickest at the inner periphery thereof.

8. A bellows as defined in claim 6 wherein said end portions each have a plurality of concentric reinforcing ribs formed therein for preventing collapse of the respective end portions when the interior of said bellows is subjected to said vacuum.

9. A bellows as defined in claim 8 wherein said bellows is fabricated from polypropylene.

References Cited by the Examiner

UNITED STATES PATENTS

| Re. 24,710 | 10/1959 | Yowell et al. | 92—34 |
| 71,757 | 12/1867 | Hoffman | 137—505.41 |
| 2,083,943 | 6/1937 | Clifford | 92—34 X |
| 2,112,211 | 3/1938 | Parks | 92—34 X |
| 2,419,008 | 4/1947 | Coffman et al. | 92—103 |
| 2,431,921 | 12/1947 | Cook | 92—103 |

FOREIGN PATENTS

| 1,012,002 | 4/1952 | France. |
| 1,169,220 | 9/1958 | France. |

MARTIN P. SCHWADRON, *Primary Examiner.*

I. C. COHEN, *Assistant Examiner.*